June 16, 1959  F. K. H. WAHLGREN  2,890,606
ATTACHMENT FOR PROVIDING AN ACCURATE SPACING ON ANGULAR SETTING
Filed Dec. 12, 1956
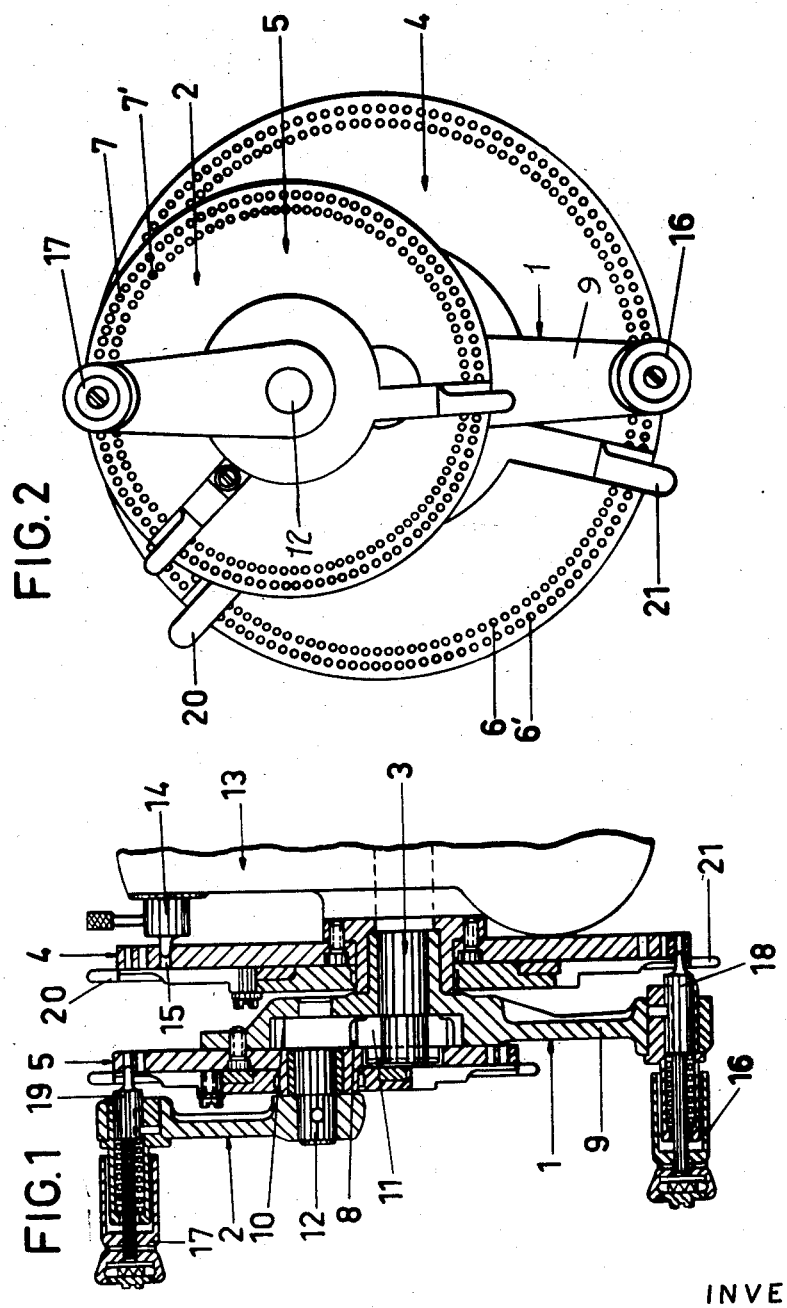
INVENTOR
F. K. H. WAHLGREN

United States Patent Office 2,890,606
Patented June 16, 1959

2,890,606

ATTACHMENT FOR PROVIDING AN ACCURATE SPACING OR ANGULAR SETTING

Frans Karl Henrik Wahlgren, Koping, Sweden, assignor to Köpings Mekaniska Verkstads Aktiebolag, Koping, Sweden, a corporation of Sweden Application December 12, 1956, Serial No. 627,797

Claims priority, application Sweden December 15, 1955

7 Claims. (Cl. 74—813)

This invention relates to an attachment for providing an accurate spacing or angular setting, comprising an output shaft driven by cranks having index plates mounted thereon, the rotation of said output shaft determining the spacing or angular setting, and the attachment is particularly designed so as to permit its assembly with an indexing head including a gearing.

The primary object of the invention is to provide an attachment of the type referred to including two cranks which have index plates with a number of holes therein arranged in circles, and which are connected to the output shaft, one crank being adapted to cause the shaft to rotate in one direction while the other crank is adapted to cause the shaft to rotate in the other direction, the transmission ratio of the cranks and the output shaft and the numbers of holes of the circles in the index plates being so selected that a resulting very small angular setting is imparted to the output shaft when any of the cranks is moved through the distance between two holes.

Further objects and advantages of the invention will become apparent from the following detailed description, reference being had to the accompanying drawing showing an embodiment, chosen by way of example, of the attachment according to the present invention.

In the drawing:

Fig. 1 is a vertical longitudinal section of the attachment, and

Fig. 2 is a front view thereof.

The indexing attachment consists of two cranks 1 and 2 and an output shaft 3 driven thereby. The crank 1 cooperates with an index plate 4 while the crank 2 cooperates with an index plate 5.

The attachment is of such a nature that the shaft 3 rotates in one direction when crank 1 is actuated and in the other direction when crank 2 is actuated. The transmission ratio of cranks 1 and 2 to the output shaft 3 and the numbers of holes of the hole circles 6 and 7 in the index plates 4 and 5 are so selected that a resulting very small angular setting is imparted to the output shaft 3 when crank 1 or crank 2 is moved through the distance between two holes. By reason of the resulting angular setting it is possible to adjust any desired division or angle with an accuracy plus or minus half the resulting angular setting.

In order not to confuse the adjustment, the two cranks 1 and 2 in a preferred embodiment of the attachment are adapted to be displaced in the same direction.

As shown in the drawing, the crank 1 is attached to the output shaft 3, in such a manner that the transmission ratio of crank 1 to shaft 3 is 1:1, while crank 2 is connected to the output shaft 3 via a gearing 8, i.e. the transmission ratio of crank 2 to shaft 3 is greater or smaller than 1:1. The transmission ratio of crank 1 to shaft 3 may, however, be greater or smaller than 1:1, and the transmission ratio of crank 2 to shaft 3 may be 1:1.

The crank 1 is freely mounted on the output shaft 3 and adapted to be connected over the gearing 8 to the shaft 3 when the other crank 2 engages in some of the holes in its index plate.

The crank 2 is mounted on the shaft 12 of one spur gear 10 of the gearing 8 consisting preferably of a pair or spur gears 10 and 11 being countersunk in the crank arm 9 of the crank 1. The gears 11 is fixedly secured to the output shaft 3.

The index plate 5 of the crank 2 is fixedly secured to the crank arm 9 of the crank 1 so that the plate 5 covers the countersunk portion in the crank arm 9, the index plate 5 and the crank arm 9 collectively forming the casing of the gearing 8 constituted by the spur gears 10 and 11.

The index plate 4 of the crank 1 is rotatable in relation to the output shaft 3. For locking the index plate 4, said plate is adapted to cooperate with a preferably spring-loaded pin 14 provided on the attachment or the indexing head 13 and engaging in holes 15 in the index plate 4. Said holes 15 can either be provided precisely for this purpose or be the holes of the hole circle 6.

Both cranks 1 and 2 have their handles 16 and 17 fitted with spring-loaded pins 18 and 19 which are adapted, when the cranks 1 and 2 are locked to the index plates 4 and 5, to engage in some of the holes of the hole circles 6 and 7. The pins 18 and 19 are mounted in eccentric bushings which are in turn mounted in the cranks 1 and 2. By turning both the pins and the bushings at the same time, the pins 18 and 19 can be caused to engage with the holes circles 6' and 7' instead of the hole circles 6 and 7 and vice versa.

According to one embodiment of the invention, the index plates 4 and 5 may be provided with only one hole circle each. According to another embodiment one index plate may be provided with two circles of holes and the other with one circle of holes. A greater number of hole circles may also occur.

For the calculation of a certain division or angular setting, a coarse adjustment is first effected with one crank as close as possible on the correct side of the desired division or angular setting. After that, a fine adjustment is effected in that both cranks 1 and 2 are moved each through an equal number of holes until the correct setting has been attained. In practice the numbers of holes for the crank performing both the coarse and fine adjustment are of course added, whereupon the crank is moved at a time through the obtained number of holes. To facilitate the setting, both index plates 4 and 5 have adjustable arms 20 and 21 designating the number of holes that the cranks 1 and 2 have to be moved beyond full revolutions.

According to an embodiment of the attachment the transmission ratio of crank 1 to the output shaft 3 is 1:1 while the transmission ratio of crank 2 to the output shaft 3 is 5:7. The circle of holes 6 in the index plate 4 has 144 holes while the circle of holes 7 in the index plate 5 has 103 holes. If the gearing of the indexing head 13 has a ratio of 1:40, the spindle of the indexing head 13 rotates through $$\frac{1}{40 \times 144} \text{ revolutions}$$

when the crank 1 is moved one step. When the crank 2 is then moved one step, the spindle of the indexing head 13 rotates in the opposite direction through $$\frac{5}{40 \times 7:103} \text{ revolutions}$$

the resulting rotation of the spindle being $$\frac{1}{4152960} \text{ revolutions}$$

or 0.312 second.

Example 1

It is assumed that the revolution is to be divided into 137 equal portions and that the coarse adjustment is to be effected with crank 1. It will appear from the term $$\frac{40 \times 144}{137}$$

that the crank must first be moved through 42 steps, for the term when computed will be 42.043795. The amount 0.043795 is then multiplied by 721, which corresponds to the number of holes through which each crank is to be moved at the fine adjustment in order that the resulting rotation of the spindle may correspond to a displacement of crank 1 by one hole. The multiplication gives 31.576 holes, and each crank 1 and 2 is therefore moved through 32 holes. Thus, crank 1 is moved through a total of 74 holes and crank 2 through 32 holes.

The fault will amount to $(1-0.576) \times 0.312 = 0.132$ second per division and in total to $0.132 \times 137 = 18$ seconds.

Example 2

It is assumed that the revolution is to be divided into 128 equal portions. The term $$\frac{40 \times 144}{128}$$

will be exactly equal to 45, for which reason crank 1 is to be moved through 45 holes. No fine adjustment need be effected.

To restrict as far as possible the number of holes through which the cranks have to be moved, circles of holes 6' and 7' have been provided in one or both index plates 4 and 5. Said circle or circles should be chosen so that one does not obtain the same fine adjustment. It must nevertheless be sufficiently accurate for all divisions below 100 and most divisions between 100 and 200, i.e. where the fault does not lie in the vicinity of the maximum value. In the former case a sufficiently accurate division is obtained for at least up to 400 divisions. Above said value the division fault has to be compensated for to a certain extent by moving each of the cranks 1 and 2 through one hole too much or too little, at certain intervals.

According to an embodiment of the attachment the circle 6' comprises 145 holes while the circle 7' comprises 96 holes.

Example 3

It is assumed that the revolution is to be divided into 131 equal portions and that the circles of holes 6' and 7' are employed. The resulting rotation of the spindle for a displacement of each crank by one hole will be $$\frac{5}{40 \times 7 \times 103} - \frac{1}{40 \times 145} = \frac{1}{1045450} \text{ revolutions}$$

or 1.24 seconds, the spindle rotating in the direction opposed to the cranking direction.

With a coarse adjustment of the crank 1, said crank has first to be moved through $$\frac{40 \times 145}{131} = 44.274809$$

or in other words 45 holes. The term $(1-0.274809) \times 180.25$ gives 130.72 or more exactly 131 holes through which each of the cranks has to be moved for fine adjustment. Consequently, crank 1 is to be moved through $45+131=176$ holes or through one revolution and 31 holes, while crank 2 is to be moved through 131 holes or through one revolution and 28 holes. The fault will amount to $(1-0.72) \times 1.24 = 0.347$ second per division, or in total to $0.347 \times 131 = 45.5$ seconds.

At an angular setting, in which the circles 6 and 7 are employed, one degree corresponds to 16 holes of the circle 6, which is obtained from the term, $$\frac{144 \times 40}{360} = 16$$

Thus, one hole is $$\frac{60}{16} = 3.75 \text{ minutes}$$

According to the foregoing, the displacement of each crank by one hole is equal to 0.312 second and one minute is thus $$\frac{60}{0.312} = 192.26 \text{ holes}$$

Example 4

If it is desired to set e.g. the angle 53°14'18" one first obtains $53 \times 16 = 848$ holes through which crank 1 has to be moved. 14'18" is equal to 14.3 minutes which are to be divided by 3.75 whereby $$3 + \frac{3.05}{3.75}$$

is obtained. For the coarse adjustment crank 1 must therefore be moved through a further 3 holes. For the fine adjustment both cranks 1 and 2 have to be moved each through $3.05 \times 192.26 = 586.4$ holes. In total, crank 1 should therefore be moved through $848+3+586=1437$ holes and crank 2 through 586 holes. Crank 1 is thus moved through 9 revolutions and 141 holes while crank 2 is moved through 5 revolutions and 71 holes.

The fault of an angular setting is always less than $$\frac{0.312}{2} = 0.156 \text{ seconds}$$

For an indexing head this accuracy is unnecessarily great and it is therefore possible to use a circle of holes 7' having 96 holes. In this case crank 1 is to be moved through $848+4+3=855$ holes or through 5 revolutions and 135 holes. Crank 2 is to be moved only through 3 holes. In this instance, the fault of the angular adjustment will always be less than 8 seconds. The fault will consequently be larger but in return one need not move the cranks through as many holes.

The invention is not limited to the features described above and shown in the drawing but can be varied in many ways within the scope of the appendant claims. The transmission ratios of the cranks 1 and 2 to the output shaft can thus be varied within wide limits as well as the numbers of holes of the circles in the index plates 4 and 5. Furthermore, the attachment according to the invention may be employed in other connections than in combination with indexing heads.

What I claim and desire to secure by Letters Patent is:

1. An attachment for a dividing head or a rotary table for providing an accurate spacing or angular setting, comprising an output shaft, a first crank freely rotatably mounted on said output shaft, gearing means on said output shaft and on said first crank, a second crank on said gearing means, an index plate for said second crank mounted on said first crank, a further index plate for said first crank fixable relative to said output shaft, said index plates each having a plurality of index holes therein arranged along a circle, and means on said first crank for engaging in the holes in said further index plate and means on said second crank for engaging in the holes in said index plate.

2. An attachment as claimed in claim 1 in which said gearing means connects said first crank directly to said output shaft when said further index plate is held fixed to said index plate.

3. An attachment as claimed in claim 2 in which said gearing means connects said second crank to said output shaft with a gear ratio greater than 1:1.

4. An attachment as claimed in claim 2 in which said gearing means connects said second crank to said output shaft with a gear ratio less than 1:1.

5. An attachment as claimed in claim 2 in which said gearing means comprises a first spur gear on said output shaft, a shaft on said first crank on which said second crank is mounted, and a second spur gear on said shaft engaging with said first spur gear, said first crank having a recess therein in which said gearing means is housed.

6. An attachment as claimed in claim 1 in which said further index plate is rotatably mounted relative to said output shaft, and means on said attachment engageable with said further index plate for fixing said further index plate relative to said output shaft.

7. An attachment as claimed in claim 1 in which at least one of said index plates has two concentric circles of holes therein, and said means on the crank corresponding to said index plate for engagement with said index plate is eccentrically rotatably mounted on the crank for engagement in the holes in either circle of holes.

References Cited in the file of this patent

UNITED STATES PATENTS

| | | |
|---|---|---|
| 612,412 | Grohmann | Oct. 18, 1898 |
| 2,440,552 | Ost | Apr. 27, 1948 |
| 2,677,315 | Hansen | May 4, 1954 |